United States Patent
Okano et al.

(10) Patent No.: US 10,006,403 B2
(45) Date of Patent: Jun. 26, 2018

(54) CYLINDER HEAD GASKET

(75) Inventors: Takashi Okano, Pinckney, MI (US); Jake Hu, Canton, MI (US)

(73) Assignee: Federal-Mogul LLC, Southfield, MI (US)

( * ) Notice: Subject to any disclaimer, the term of this patent is extended or adjusted under 35 U.S.C. 154(b) by 636 days.

(21) Appl. No.: 12/822,392

(22) Filed: Jun. 24, 2010

(65) Prior Publication Data

US 2010/0327540 A1   Dec. 30, 2010

Related U.S. Application Data

(60) Provisional application No. 61/219,916, filed on Jun. 24, 2009.

(51) Int. Cl.
*F02F 11/00* (2006.01)
*F16J 15/08* (2006.01)

(52) U.S. Cl.
CPC .......... *F02F 11/002* (2013.01); *F16J 15/0818* (2013.01); *F16J 15/0825* (2013.01); *F16J 2015/085* (2013.01); *F16J 2015/0862* (2013.01)

(58) Field of Classification Search
CPC . F02F 11/002; F16J 15/0818; F16J 2015/085; F16J 15/08
USPC ................................. 277/592–596
See application file for complete search history.

(56) References Cited

U.S. PATENT DOCUMENTS

| | | | |
|---|---|---|---|
| 5,626,348 A | 5/1997 | Takada et al. | |
| 5,713,580 A * | 2/1998 | Ueta | 277/593 |
| 5,725,222 A | 3/1998 | Kobayashi | |
| 5,924,700 A * | 7/1999 | Kobayashi | 277/595 |
| 6,164,662 A * | 12/2000 | Uemura et al. | 277/593 |
| 6,457,724 B2 * | 10/2002 | Ogaeri et al. | 277/595 |
| 6,502,829 B2 * | 1/2003 | Watanabe et al. | 277/593 |
| 6,644,669 B2 * | 11/2003 | Unseld et al. | 277/593 |
| 6,708,982 B2 * | 3/2004 | Zerfass et al. | 277/592 |
| 6,796,562 B2 | 9/2004 | Stapel | |
| 7,374,177 B2 * | 5/2008 | Tripathy et al. | 277/593 |
| 7,559,556 B2 * | 7/2009 | Belter et al. | 277/593 |
| 7,997,585 B2 * | 8/2011 | Werz et al. | 277/593 |
| 2002/0153666 A1 * | 10/2002 | Unseld | 277/593 |
| 2003/0042689 A1 * | 3/2003 | Diez et al. | 277/593 |
| 2005/0140096 A1 * | 6/2005 | Golombek et al. | 277/594 |

(Continued)

FOREIGN PATENT DOCUMENTS

| | | |
|---|---|---|
| JP | 58-162252 U | 10/1983 |
| JP | 63-180770 U | 11/1988 |

(Continued)

*Primary Examiner* — Eugene G Byrd
(74) *Attorney, Agent, or Firm* — Robert L. Stearns; Dickinson Wright, PLLC

(57) ABSTRACT

A cylinder head gasket constructed in accordance with invention provides a reliable gas/fluid-tight seal between a cylinder head and cylinder block during assembly and maintains the seal during use without substantially losing the contact pressure provided by the gasket during assembly while in use. The cylinder head gasket includes a first functional layer having an opening bounded by an annular free edge. The first functional layer has a full bead and a half bead. The half bead is between the full bead and the free edge. The half bead extends in a first axial direction to a plateau portion and the full bead extends in a second axial direction opposite the first axial direction to a peak.

4 Claims, 3 Drawing Sheets

(56) References Cited

U.S. PATENT DOCUMENTS

2005/0206091 A1* 9/2005 Detmann et al. ............ 277/594
2006/0232017 A1* 10/2006 Hamada et al. ............ 277/594
2008/0007014 A1   1/2008 Foster
2009/0189359 A1* 7/2009 Yoshijima et al. .......... 277/591

FOREIGN PATENT DOCUMENTS

JP      08-105544 A      4/1996
WO   2006/061042 A1   12/2004

* cited by examiner

CYLINDER HEAD GASKET

CROSS-REFERENCE TO RELATED APPLICATION

This application claims the benefit of U.S. Provisional Application Ser. No. 61/219,916, filed Jun. 24, 2009, which is incorporated herein by reference in its entirety.

BACKGROUND OF THE INVENTION

1. Technical Field

This invention relates generally to static gaskets of the type used to establish a gas/fluid-tight seal between two members to be clamped together, such as a cylinder head gasket.

2. Related Art

In establishing a gas/fluid-tight seal between two members to be clamped together, such as between a cylinder head and cylinder block, it is common to use a static cylinder head gasket having one or more layers, referred to as a multilayer gasket. Generally, at least one of the layers of the multilayer gasket, sometimes referred to as a functional layer, has one or more seal beads to facilitate establishing a fluid tight seal. Another of the layers, sometimes referred to as a distance layer, is configured to abut the function layer to facilitate establishing the fluid tight seal. Upon being installed, contact stresses are typically established across the beads, wherein the contact stresses extend to an annular edge bounding the opening, e.g. cylinder bore, being sealed. Unfortunately, although providing an initially reliable seal, over time and while in use, damage can result to the surfaces being clamped and sealed against one another, thereby impacting the ability of the seal to remain air and/or fluid tight. This is particularly troublesome at peripheral edges being sealed, such as at a cylinder bore edge between the cylinder head and cylinder block. In use, the gasket undergoes cyclic stress cycles at the peripheral edge being sealed throughout each full stroke of a piston. The cyclical stresses result in relative movement of the gasket material against the respective surfaces being sealed, e.g. cylinder head and cylinder block. The movement of the gasket material against the mating surfaces thereby results in the aforementioned surface damage, such as by way of fretting. Accordingly, the ability of the seal assembly to maintain a reliable seal across the clamped surfaces is typically diminished over time.

SUMMARY OF THE INVENTION

A cylinder head gasket constructed in accordance with invention provides a reliable gas/fluid-tight seal during assembly and maintains a reliable seal during use without losing or substantially losing the contact pressure established during assembly between a cylinder head and cylinder block while in use. In accordance with one aspect of the invention, the cylinder head gasket includes a distance layer and a functional layer. The distance layer and functional layer have an annular free edge extending about a central axis, wherein the annular free edges are configured to register substantially flush with an opening being sealed. The functional layer has full bead radially outward from the free edge and a half bead between the full bead and the free edge. The half bead is axially aligned with and extends axially outwardly from the stopper layer in an axial first direction to a plateau and the full bead extends in an axial second direction opposite the first direction.

In accordance with another aspect of the invention, a cylinder head gasket includes a distance layer with a pair of functional layers on opposite sides of the distance layer with a stopper layer positioned between the distance layer and at least one of the functional layers. The distance layer, functional layers and stopper layer each having an opening bounded by an annular free edge extending about a central axis, wherein the central axes and annular free edges are axially aligned with one another. At least one of the funcional layers has full bead radially outward from the free edges and a half bead between the full bead and the free edges. The half bead overlies the stopper layer and is configured for compressed abutment therewith. The half bead extends axially outwardly from the stopper layer to a plateau portion spaced axially from the stopper layer while in a relaxed, uncompressed state, which results in a substantially negligible contact stress at the annular free edge in use, with an increased contact stress being formed radially outwardly from the annular free edge when in use.

In accordance with yet another aspect of the invention, both functional layers on opposite sides of the distance layer have a half bead configured in mirrored relation with one another, wherein the half beads extend axially away from one another to annular free edges while in an uncompressed state.

In accordance with yet another aspect of the invention, a gasket assembly includes a pair of functional layers each having an opening bounded by an annular free edge extending about a central axis, wherein the axes and annular free edges are axially aligned with one another. The functional layers each have full beads configured to abut one another. At least one of the functional layers has a half bead extending axially outwardly to its free edge in spaced relation from the other functional layer.

In accordance with yet another aspect of the invention, a gasket assembly includes a functional layer having a substantially planar portion and an opening bounded by annular free edge extending about a central axis. The functional layer has a full bead extending axially outwardly from the planar portion in a first axial direction to abut a cylinder block and a half bead extending axially outwardly from the planar portion in a second axial direction opposite the first axial direction to abut a cylinder head.

The gasket assemblies constructed in accordance with the invention result in negligible contact stresses at the annular free edges of the opening, e.g. cylinder bore, being sealed. An increased contact stress is formed radially outwardly from the annular free edge, thereby enhancing the ability to maintain an air/fluid tight seal. Any contact stresses established across the gasket assemblies are kept from fluctuating greatly in use, thereby minimizing the potential for fretting and wear. Further, a gasket assembly constructed in accordance with the invention maintains contact pressure between a cylinder head and cylinder block over the full stroke of the piston, even when the cylinder head and cylinder block are spaced their further distance from one another. As such, a gasket assembly constructed in accordance with the invention not only establishes and maintains a reliable gas/fluid tight seal, but also exhibits a long and useful life.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
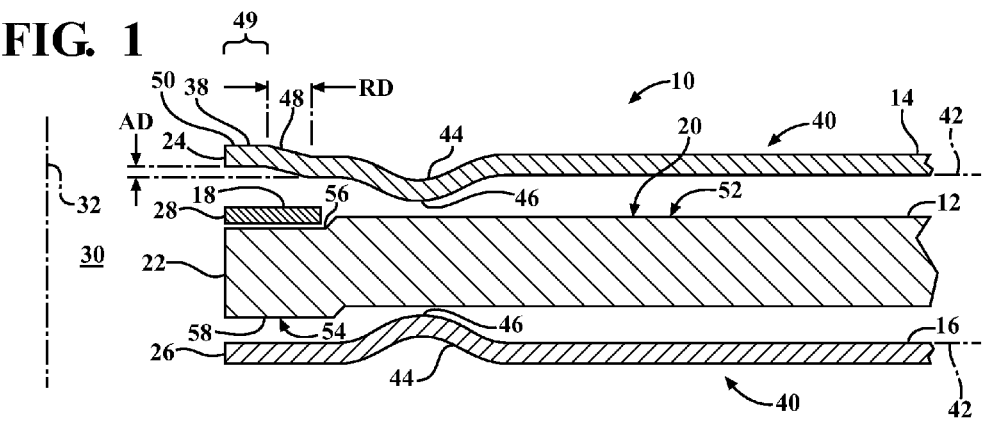
FIG. 1 is a partial cross-sectional side view of a gasket assembly constructed in accordance with one aspect of the invention.
Figure 1A:
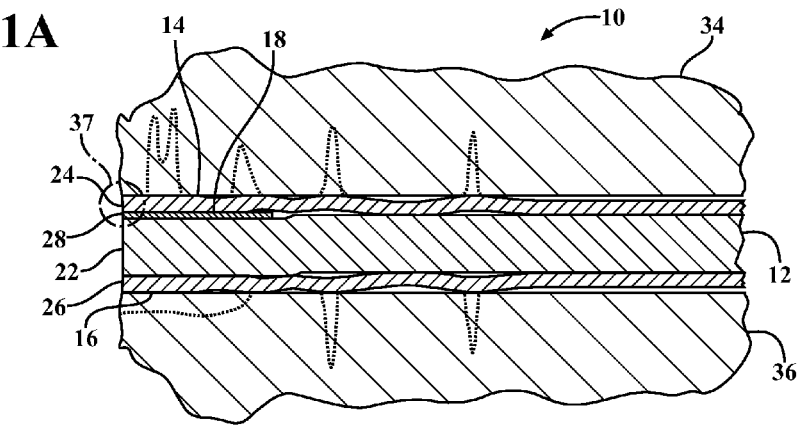
FIGS. 1A and 1B are views of the gasket assembly of FIG. 1 assembled between a cylinder head and a cylinder block under different states of compression.
Figure 1B:
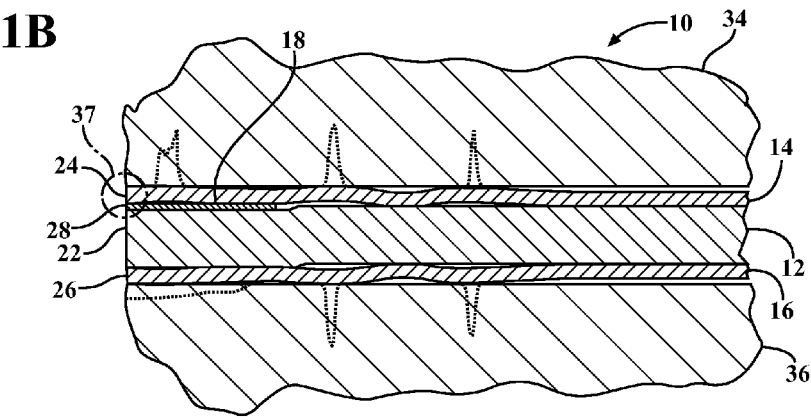

Referring in more detail to the drawings, FIG. 1 illustrates a gasket assembly, referred to hereafter as gasket 10, constructed in accordance with one aspect of the invention. The gasket 10 includes a distance layer 12; at least one, and shown here as a pair of first and second functional layers 14, 16 and a stopper layer 18. The functional layers 14, 16 are arranged on opposite sides of the distance layer 12, and the stopper layer 18 is arranged between one of the functional layers, shown here as the upper functional layer 14 and an upper surface 20 of the distance layer 12. The distance layer 12, functional layers 14, 16 and a stopper layer 18 each have an annular free edge 22, 24, 26, 28 bounding a common opening 30 having a central axis 32, such as a combustion chamber opening configured to register with a cylinder bore. The free edges 22, 24, 26, 28 are configured to be axially aligned (axially herein is intended to be with reference to the axis 32) substantially flush with one another upon being compressed between a cylinder head 34 and block 36 (FIGS. 1A, 1B). At least one, and shown here as the upper functional layer 14, has a half bead 38 extending to the free edge 24 and aligned axially over the stopper layer 18. The half bead 38 is constructed to extend axially outwardly from the stopper layer 18 while in a relaxed, uncompressed state. Upon being compressed between the cylinder head 34 and cylinder block 36, and while tested under operating conditions over a full stroke of a piston within the cylinder bore, the contact pressure across a free edge region 37 (FIGS. 1A and 1B) of the functional layer 14, stopper layer 18 and distance layer 12 was substantially 0 MPa. Accordingly, there is no or substantially no wear to the gasket 10 or the cylinder head 34 from fretting in during use.

The functional layers 14, 16 are constructed from a resilient metal, such as spring steel, for example, and can be provided having a thickness as desired for the intended application. The functional layers 12, 14 each have generally planar main body portions 40 extending along a plane 42, with full beads 44 extending axially outwardly from the plane 42. The full beads 44 of the functional layers 14, 16 are arranged in mirrored relation to one another on opposite sides of the distance layer 12, with each full bead 44 extending axially inwardly toward the distance layer 12 to an apex or peak 46 configured to abut the distance layer 12. The aforementioned half bead 38 is formed radially inwardly of the full bead 44 such that the half bead 38 is located between the full bead 44 and the opening 30. The half bead 38 has an inclined portion 48 that extends radially and axially outwardly from the plane 42 in a direction opposite the corresponding full bead 44 of the functional layer 14. Accordingly, the inclined portion 48 has an axial component that extends axially away from the distance layer 12 a predetermined axial distance AD and a radial component that extends radially over a predetermined radial distance RD. The axial and radial distances AD, RD can be varied from application to application, and can also be varied annularly about the circumference of the opening 30, as desired. Accordingly, the distances AD, RD can be constant; they can vary, or they can have constant portions and varied portions, as desired. The half bead 38 has a plateau portion 49 extending from the inclined portion 48 to the free edge 24. The plateau portion 49 has an upper flat surface 50 facing away from the distance layer 12 and extending generally parallel to the plane 42 for fluid-tight sealing abutment with the cylinder head 34. The entire half bead 38, including the incline and plateau portions 48, 49, is configured overlie the stopper layer 18. Upon being compressed between the cylinder head 34 and engine block 36, neither the full beads 44 nor the half bead 38 are fully compressed to a flattened state. Accordingly, both the full beads 44 and half bead 38 remain elastically biased and retain there ability to establish high sealing pressures to maintain a gas/fluid-tight seal in use and over a complete cycle of a piston.

The distance layer 16 can be constructed from a relatively rigid metal material, such as cold rolled steel or stainless steel, for example. The distance layer 16 can be constructed having a generally flat, planar body, or as shown here, can be formed having a planar body portion 52 with stepped portion 54 offset axially from the planar portion 52, wherein the stepped portion 54 extends to the free edge 22. The stepped portion 54 being axially offset from the planar portion 52 provides an axially recessed surface 56 sized to received the stopper layer 18 partially therein, wherein the stopper layer 18 extends partially axially outwardly above the adjacent non-recessed, planar portion 52. Accordingly, the depth (d) of the recessed surface 56 is less than the thickness (t) of the stopper layer 18. In addition, the stepped portion 54 provides an axially raised surface 58 opposite the recessed surface 56. It should be recognized that the distance layer 12 could be otherwise configured, and that a purely flat, planar piece of suitable material could be used.

During assembly, when the cylinder head 34 is clamped to the engine block 36, the full beads 46 are partially flattened into compressed abutment with the planar portion 52 to establish a gas/fluid-tight seal. To prevent the full beads 46 from being completely flattened, the half bead 38 on the functional layer 14 is brought into partially compressed abutment with the stopper layer 18. With the stopper layer 18 being slightly raised above planar portion 52, the half bead 38 and the full bead 44 are kept from being completely flattened. Likewise, on the opposite side of the distance layer 12, the raised surface 58 prevents the full bead 44 adjacent thereto from being fully flatted during assembly and while under load in use. Accordingly, the gas/fluid-tight seal is formed during assembly between the full beads 44 and the distance layer 12 is maintained in use, while the stresses immediately adjacent the openings 22, 24, 26 is substantially 0 MPa, thereby minimizing the potential for fretting.

Figure 2:
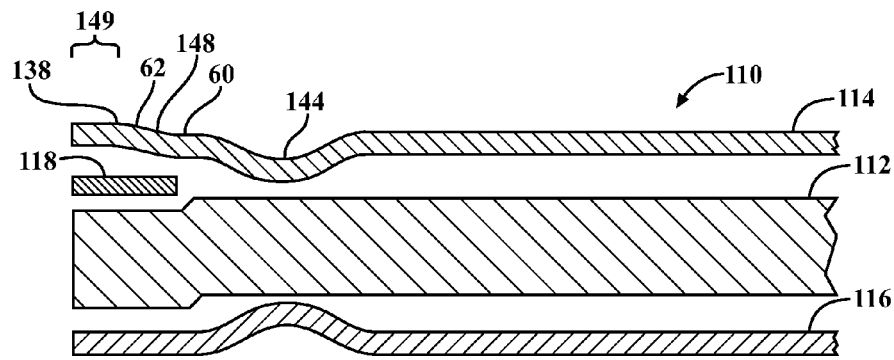
FIG. 2 is a partial cross-sectional side view of a gasket assembly constructed in accordance with another aspect of the invention.

In FIG. 2, a gasket 110 constructed in accordance with another aspect of the invention is shown, wherein the same reference numerals, offset by a factor of 100, are used to identify similar features as discussed above. The gasket 110 includes a distance layer 112, a pair of functional layers 114, 116 and a stopper layer 118. The general configuration of the gasket 110 is the same as that described with regard to the gasket 10, however, a half bead 138 is constructed having controlled radii transitions extending from a full bead 144. One controlled radii is represented generally at 60, and serves as a transition region from the full bead 144 to an inclined portion 148 of the half bead 138. Another controlled radii is represented generally at 62, and serves as a transition region between the inclined portion 148 of the half bead 138 and a plateau portion 149 of the half bead 138. The controlled radii 60, 62 serve to provide smooth stress gradients and to reduce the contact stresses across the half bead 138 against the stopper layer 118 and the overlying cylinder head (not shown), thereby further enhancing the sealing performance of the gasket 110.

Figure 3:
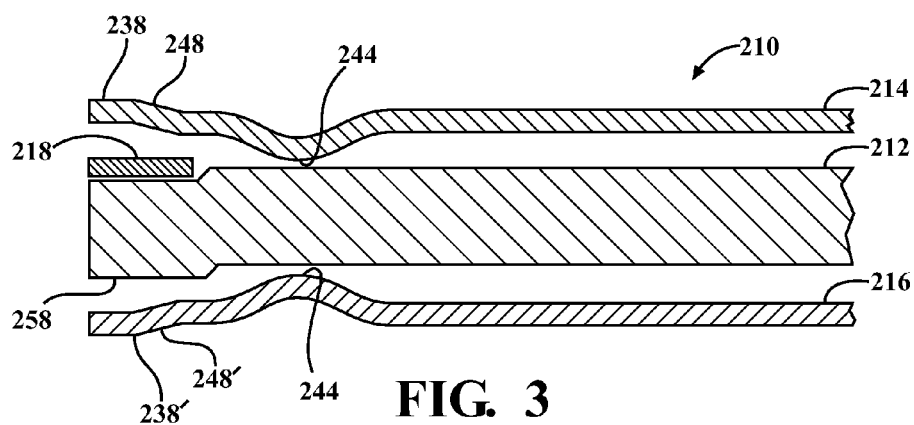
FIG. 3 is a partial cross-sectional side view of a gasket assembly constructed in accordance with another aspect of the invention.

In FIG. 3, a gasket 210 constructed in accordance with another aspect of the invention is shown, wherein the same reference numerals, offset by a factor of 200, are used to identify similar features as discussed above. The gasket 210 includes a distance layer 212, a pair of functional layers 214, 216 and a stopper layer 218. The general configuration of the gasket 210 is the same as that described with regard to the gasket 10, however, the functional layer 216, in addition to a half bead 238 on the functional layer 214, has a half bead 238'. The half beads 238, 238' are configured in symmetrically mirrored relation with one another, and thus, diverge axially away from one another via their respective inclined portions 248, 248'. Thus, in addition to the half bead 238 being axially compressed against the raised stopper layer 238, the half bead 238' is axially compressed against a raised surface 258 of the distance layer 212. Accordingly, the gas/fluid-tight seal established and maintained by the gasket 210 is further enhanced via the pair of half beads 238, 238' working in combination with the respective full beads 244. Otherwise, the gasket 210 is the same as described in relation to the gasket 10.

Figure 4:
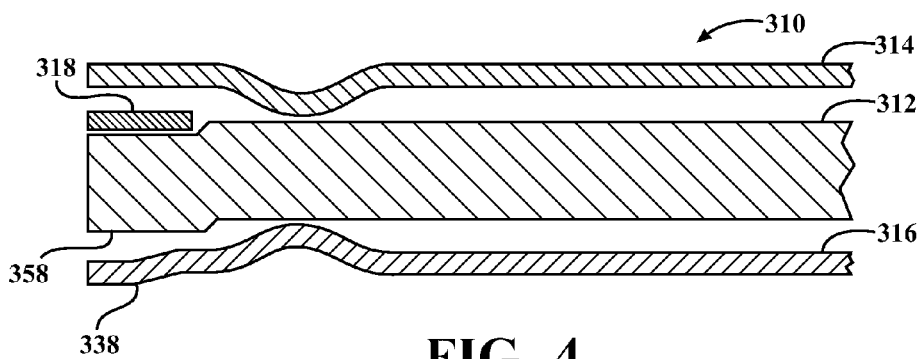
FIG. 4 is a partial cross-sectional side view of a gasket assembly constructed in accordance with another aspect of the invention.

In FIG. 4, a gasket 310 constructed in accordance with another aspect of the invention is shown, wherein the same reference numerals, offset by a factor of 300, are used to identify similar features as discussed above. The gasket 310 includes a distance layer 312, a pair of functional layers 314, 316 and a stopper layer 318. The overall configuration of the gasket assembly components is generally the same as discussed above with regard to gasket 10, however, the orientation of the functional layers 314, 316 is reversed. Accordingly, the bottom functional layer 316 has a half bead 338, while the upper functional layer does not. The half bead 338 of the bottom functional layer 316 is formed the same as discussed above, and thus, it is located in axial alignment with the stopper layer 318, however, it is on the opposite side of the distance layer 312 from the stopper layer 318 in axial alignment with a raised surface 358 of the distance layer 312.

Figure 5:
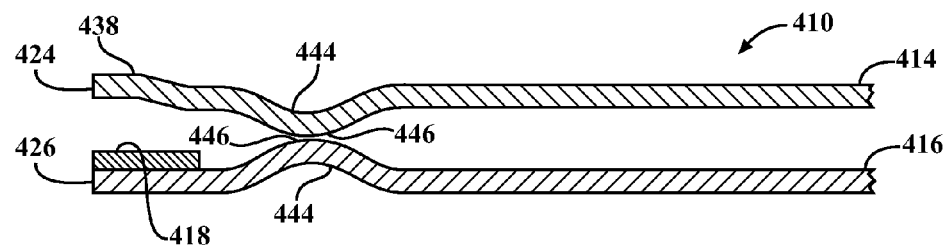
FIG. 5 is a partial cross-sectional side view of a gasket assembly constructed in accordance with another aspect of the invention.

In FIG. 5, a gasket 410 constructed in accordance with another aspect of the invention is shown, wherein the same reference numerals, offset by a factor of 400, are used to identify similar features as discussed above. The gasket 410 includes a pair of functional layers 414, 416 and a stopper layer 418, however, it does not include a distance layer. The overall configuration of the included gasket assembly components are the same as those discussed above with regard to gasket 10, and thus, the upper functional layer 414 has a half bead 438 extending to an annular free edge 424, while both functional layers 414, 416 have a full bead 444 formed in symmetrically mirrored relation with one another with peaks 446 of the full beads 444 arranged to abut one another. The stopper layer 418 sandwiched between the functional layers 414, 416 and is shown resting on a planar portion of the lower functional layer 416 immediately adjacent and flush, or substantially flush with a free edge 426 thereof. The stopper layer 418 can be fixed to the planar portion of the functional layer 416, such as by an adhesive or weld joint, for example. So, other than not having a distance layer, the construction of the gasket 410 is the same as the gasket 10 discussed above.

Figure 6:
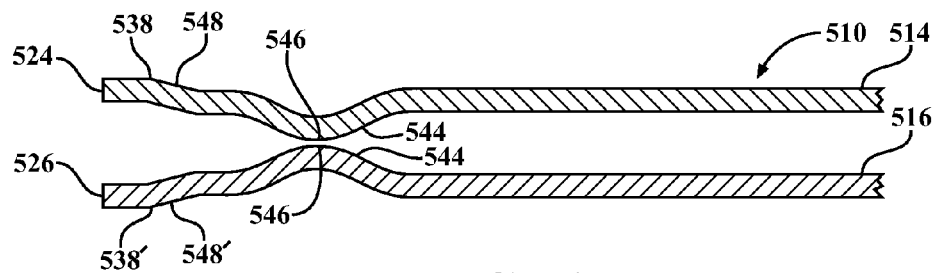
FIG. 6 is a partial cross-sectional side view of a gasket assembly constructed in accordance with another aspect of the invention.

In FIG. 6, a gasket 510 constructed in accordance with another aspect of the invention is shown, wherein the same reference numerals, offset by a factor of 500, are used to identify similar features as discussed above. The gasket 510 includes a pair of functional layers 514, 516 configured generally the same as discussed above with regard to the gasket 210 of FIG. 3. However, the gasket 510 does not include a distance layer nor a stopper layer. The function layers 514, 516 each have half beads 538, 538' configured in symmetrically mirrored relation with one another extending to free edges 524, 526. The half beads 538, 538' diverge axially away from one another via their respective inclined portions 548, 548'. In addition, the functional layers 514, 516 each have full beads 544 arranged in mirrored relation to one another, with each full bead 544 extending axially toward one another to an apex or peak 546. Accordingly, the peaks 546 engage one another, while the half beads 538, 538' remain at least slightly axially spaced from one another in use. The half beads 538, 538', as with all the half beads discussed thus far, remain in contact with respective cylinder head and cylinder block in use. As such, a fluid/gas-tight seal is maintained even when the cylinder head and cylinder block are biased under the most extreme combustion force away from one another in use.

Figure 7:
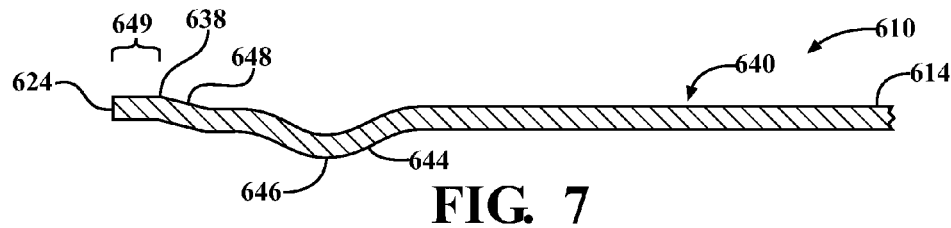
FIG. 7 is a partial cross-sectional side view of a gasket assembly constructed in accordance with another aspect of the invention.

In FIG. 7, a gasket 610 constructed in accordance with another aspect of the invention is shown, wherein the same reference numerals, offset by a factor of 600, are used to identify similar features as discussed above. The gasket 610 has a single functional layer 614 with a half bead 638 extending to an annular free edge 624. The half bead 638 diverges axially outwardly from a planar main body portion 640 to a plateau portion 649 in one direction toward a cylinder head (not shown) via an inclined portion 648. In addition, the functional layer 614 has a full bead 644 radially inwardly from the half bead 638. The full bead 644 extends in a direction axially away from the half bead 644 toward a cylinder block (not shown) to an apex or peak 646. Accordingly, the peak 646 and the plateau portion 649 face away from one another, wherein the peak 646 is configured to engage the cylinder block, while the plateau portion 649 of the half bead 638 is configured to engage the cylinder head.

Figure 8:
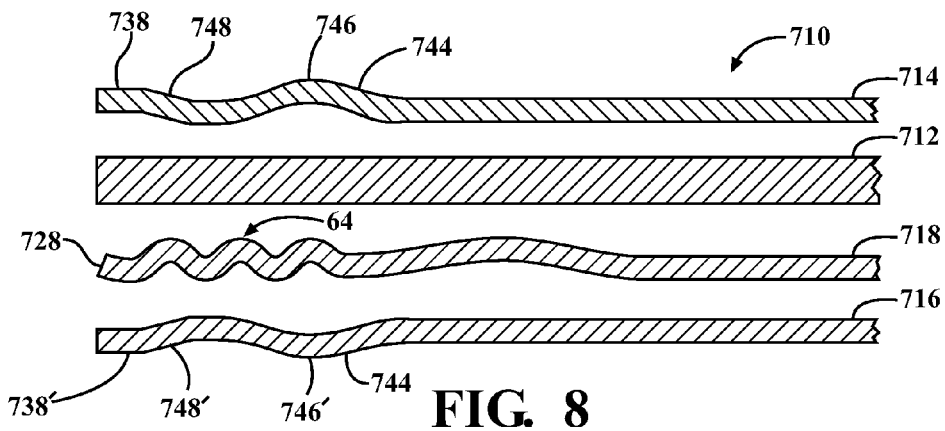
FIG. 8 is a partial cross-sectional side view of a gasket assembly constructed in accordance with another aspect of the invention.

In FIG. 8, a gasket 710 constructed in accordance with another aspect of the invention is shown, wherein the same reference numerals, offset by a factor of 700, are used to identify similar features as discussed above. The gasket 710 includes a distance layer 712, a pair of functional layers 714, 716 and a stopper layer 718. As with the gasket assembly 210, both functional layers 714, 716 have half beads 738, 738' configured in mirrored relation with one another, and thus, diverge axially away from one another via their respective inclined portions 748, 748'. In addition, both functional layers 714, 716 have full beads 744, however, rather than peaks 746 of the full beads 744 facing axially inwardly toward the distance layer 712, the peaks 746 face axially outwardly and thus, away from the distance layer 712. As such, the peaks 746 are arranged to engage the cylinder head and cylinder block upon being compressed during assembly. Further, the stopper layer 718, rather than being a generally flat piece of material extending from the cylinder bore radially outwardly beneath the half beads 738, 738' and terminating before the full beads 744, as with the previously discussed and illustrated embodiments, extends from its free edge 728 generally flush with the cylinder bore radially outwardly and fully beyond the full beads 744 of the functional layers 714, 716. In addition, the stopper layer 718 has an embossed or otherwise formed undulating section 64 serving as a stopper region, with the undulating section 64 extending from adjacent the free edge 728 radially outwardly across the half beads 738, 738' and terminating before the full beads 744.

Obviously, many modifications and variations of the present invention are possible in light of the above teachings. It is, therefore, to be understood that within the scope of the appended claims, the invention may be practiced otherwise than as specifically described.

What is claimed is:

1. A gasket, comprising:
   first and second functional layers;
   each of said first and second functional layers having an opening bounded by an annular free edge and having a full bead and a half bead which extends axially to a plateau portion while in an uncompressed state;
   in each of said first and second functional layers, said half bead being between said full bead and said free edge and said half bead and said full bead extending in the same first axial direction;
   a distance layer disposed between said first and second functional layers and having an opening aligned substantially flush with said openings of said first and second functional layers, said half beads of said first and second functional layers overlapping radially with at least a portion of said distance layer; and
   a stopper layer disposed between said distance layer and one of said first and second functional layers, said stopper layer extending from a free edge that is generally aligned with said free edges of said functional layers, and said stopper layer having an undulating section which extends from adjacent said free edge of said stopper layer radially across said half beads of said first and second functional layers.

2. The gasket as set forth in claim 1 wherein said undulating section of said stopper terminates short of radially outermost ends of said full beads of said first and second functional layers.

3. The gasket as set forth in claim 1 wherein said undulating section of said stopper includes a plurality of periodic undulations.

4. The gasket as set forth in claim 1 wherein said first and second functional layers and said stopper layer have similar thicknesses and wherein said distance layer has a greater thickness than said first and second stopper layers and than said stopper layer.

* * * * *